(12) United States Patent
Sheppard

(10) Patent No.: US 8,991,719 B2
(45) Date of Patent: Mar. 31, 2015

(54) LOW PRESSURE DROP THERMAL BY-PASS VALVE

(75) Inventor: Jeffrey Owen Sheppard, Milton (CA)

(73) Assignee: Dana Canada Corporation, Oakville, Ontario (CA)

( * ) Notice: Subject to any disclaimer, the term of this patent is extended or adjusted under 35 U.S.C. 154(b) by 1250 days.

(21) Appl. No.: 12/500,248

(22) Filed: Jul. 9, 2009

(65) Prior Publication Data

US 2011/0005741 A1    Jan. 13, 2011

(51) Int. Cl.
| | |
|---|---|
| *F01P 7/14* | (2006.01) |
| *F01P 7/16* | (2006.01) |
| *F01M 5/00* | (2006.01) |
| *F16H 57/04* | (2010.01) |
| *G05D 23/02* | (2006.01) |

(52) U.S. Cl.
CPC ........... *F01M 5/007* (2013.01); *F16H 57/0413* (2013.01); *G05D 23/022* (2013.01)
USPC ......................................... 236/34.5; 165/103

(58) Field of Classification Search
CPC ............ F01M 5/007; F01P 7/026; F01P 7/14; F01P 7/16; F01P 2060/045; F16H 57/0412; F16H 57/0413; F28F 27/02; F28F 2250/06; G05D 23/022; G05D 23/1333
USPC ............ 236/34.5, 40, 93 A, 99 K, 99 J, 99 R; 165/103, 297, 298, 916; 251/31, 322
See application file for complete search history.

(56) References Cited

U.S. PATENT DOCUMENTS

| | | | | |
|---|---|---|---|---|
| 1,784,042 A | * | 12/1930 | Carson, Jr. .................. | 236/99 R |
| 3,255,740 A | * | 6/1966 | Walsh ......................... | 123/41.09 |
| 4,190,198 A | | 2/1980 | Casuga et al. | |
| 4,193,442 A | | 3/1980 | Vian | |
| 4,524,907 A | * | 6/1985 | Wong ........................... | 236/34.5 |
| 4,883,225 A | * | 11/1989 | Kitchens ...................... | 236/34.5 |
| 5,271,559 A | * | 12/1993 | Naujock .................. | 237/12.3 B |
| 5,676,308 A | | 10/1997 | Saur | |
| 5,727,729 A | | 3/1998 | Hutchins | |
| 6,117,312 A | * | 9/2000 | Mees et al. .................... | 210/130 |
| 6,253,837 B1 | | 7/2001 | Seiler et al. | |
| 6,499,666 B1 | * | 12/2002 | Brown ......................... | 236/34.5 |
| 6,575,707 B2 | * | 6/2003 | Matt et al. ..................... | 417/228 |
| 7,124,715 B2 | | 10/2006 | Hutchins | |

(Continued)

FOREIGN PATENT DOCUMENTS

| | | |
|---|---|---|
| EP | 0235472 A1 | 9/1987 |
| GB | 2 241 301 A | 8/1991 |
| WO | 9915767 A1 | 4/1999 |

*Primary Examiner* — Marc Norman
*Assistant Examiner* — Paolo Gonzalez
(74) *Attorney, Agent, or Firm* — Marshall & Melhorn, LLC

(57) ABSTRACT

A thermal by-pass valve for a heat exchange circuit includes a housing forming a chamber and a by-pass valve port surrounded by a valve seat. The valve port is located between first and second sections of the chamber. First and second oil ports open into the first section. At least a third port opens into the second section. A thermally sensitive actuator is mounted in the first section and has a body and a piston located at one end. The body is movable in the chamber in response to extension of the piston. A valve member is operably mounted on the body and is movable by extension of the piston. A spacer projects from and is connected to the body and forms a passage through which the piston extends. The spacer acts to maintain the adjacent end of the actuator body at least the length of the passage away from an end of the chamber. The spacer can have a valve portion to close a further valve port.

18 Claims, 11 Drawing Sheets

(56) References Cited

U.S. PATENT DOCUMENTS

| | | | |
|---|---|---|---|
| 7,249,788 B2* | 7/2007 | Muhammad et al. | 285/319 |
| 7,665,513 B2* | 2/2010 | Sasaki | 165/298 |
| 7,721,973 B2* | 5/2010 | Peric | 236/93 R |
| 7,735,546 B2* | 6/2010 | Bird et al. | 165/297 |
| 7,854,256 B2* | 12/2010 | Pineo et al. | 165/297 |
| 8,066,197 B2* | 11/2011 | Sheppard | 236/93 R |
| 2006/0108435 A1* | 5/2006 | Kozdras et al. | 236/93 R |
| 2008/0093066 A1 | 4/2008 | Bird et al. | |
| 2008/0245881 A1* | 10/2008 | Peric | 236/93 R |
| 2009/0026405 A1* | 1/2009 | Sheppard et al. | 251/364 |

* cited by examiner

LOW PRESSURE DROP THERMAL BY-PASS VALVE

This invention relates to valves for by-passing a heat exchanger in a heat exchange circuit under conditions where the heat transfer function of the heat exchanger is not required or is only intermittently required.

In certain applications, such as in the automotive industry, heat exchangers are used to cool or heat certain fluids, such as engine oil or transmission fluid or oil. In the case of transmission fluid, for instance, a heat exchanger is used to cool the transmission fluid. The heat exchanger is usually located remote from the transmission and receives hot transmission oil from the transmission through supply tubing, cools it, and delivers it back to the transmission again through return tubing. However, when the transmission is cold, such as at start-up conditions, the transmission oil is very viscous and does not flow easily through the heat exchanger, if at all. In such cases, the transmission can be starved of oil and this may cause damage or at least erratic performance. Cumulative damage to the transmission can also occur if the quality of oil returned is adequate but is overcooled due to low ambient temperatures. In this case, for instance, moisture condensation in the oil (that would otherwise be vaporized at higher temperatures) may accumulate and cause corrosion or oil degradation.

In order to overcome the cold flow starvation problem, various solutions have been proposed in the past. For example, U.S. Pat. No. 6,253,837 dated Jul. 3, 2001 describes the use of a by-pass valve that makes a short circuit from the heat exchanger inlet to the heat exchanger outlet to disable the heat exchanger under certain temperature conditions. The by-pass valve includes a housing defining a valve chamber and three main ports communicate with this chamber, one being a valve port. A temperature responsive actuator is located in the chamber and operates a spring loaded valve member to open and close the valve port which can be connected to one of the heat exchanger inlet or outlet.

U.S. Published Application No. 2008/0093066 dated Apr. 24, 2008 also teaches the use of a by-pass valve for a heat exchange circuit. The valve housing forms a valve chamber containing a by-pass port surrounded by a valve seat. A thermally sensitive actuator is mounted in the chamber and an annular valve member is mounted on the actuator. A coil spring extends around the actuator and urges the valve member towards engagement of the valve seat so as to close the by-pass port. A return spring is secured to one end of the actuator and urges the actuator to retract so that the valve member opens the by-pass port.

Although these known thermal by-pass valves have worked reasonably well for their intended purpose, improvements to the operating efficiencies of such valves are desirable. One such improvement is to reduce the amount of pressure drop in the circuit during operation of the valve, thereby improving the flow of oil through the circuit and through the valve. It is also desirable to reduce the amount of leakage in the by-pass valve while it is operating in cooler mode, that is with oil flowing through the heat exchanger to which the valve is attached.

SUMMARY OF THE INVENTION

According to one embodiment of the invention disclosed herein, a thermal by-pass valve for a heat exchange circuit includes a valve housing forming a valve chamber and having a first port for an oil supply line, a second port for an oil return line, a third port for a heat exchanger supply line and a fourth port for a heat exchanger return line. The first, second, third and fourth ports communicate with the chamber. The housing also has a by-pass valve port surrounded by a primary valve seat with this port being located in the chamber and providing fluid communication between the first and second ports when the valve port is in an open position. The valve also has a thermally sensitive actuator including an actuator body having a shaft section and a movable piston extending from one end of the actuator body. The actuator is mounted in the chamber, is movable therein, and responds to extension or retraction of the piston. The piston is extendable in order to engage the housing at or near one end of the chamber. A valve member is mounted on the shaft section and is movable by extension of the piston from a first position where the valve port is in the open position to a second position where the by-pass port is closed by the valve member sealingly engaging the valve seat. A return spring is mounted in the housing and has one spring end engaging the shaft section so as to bias the shaft section away from the valve seat and to move the actuator away from the valve seat upon retraction of the piston. A spacer member projects from and is connected to the one end of the actuator body and is coaxial with the piston. The spacer member forms a piston-receiving passage into which the piston extends during use of the by-pass valve. The piston is slidable in this passage which has a length. During use of the valve, the spacer member acts to maintain the one end of the actuator body at least the length of the passage away from the one end of the chamber.

In an exemplary version of this valve, the spacer member includes a sleeve section, an annular plate section extending around the sleeve section, and a connecting section joined to and extending from the plate section and connecting the spacer member to an end section of the actuator body. The plate section is sized and arranged to act as a further valve device movable by the actuator between a closed position where flow between the fourth port and the second port is blocked and an open position where flow of oil from the fourth port to the second port can take place.

According to another embodiment of this disclosure, a thermal by-pass valve for a heat exchange circuit includes a valve housing forming a valve chamber and a by-pass valve port surrounded by a primary valve seat. The valve port is located between first and second sections of the valve chamber and first and second oil ports open into this first section while a third oil port opens into the second section. A thermally sensitive actuator is mounted in the first section of the valve chamber and has an actuator body and an extendible piston located at one end of the actuator body. The actuator body is movable in the chamber in response to extension of the piston when the actuator body is heated to a predetermined temperature by surrounding heat exchange fluid during operation of the by-pass valve and in response to retraction of the piston. A valve member is operably mounted on the actuator body so as to be movable by extension of the piston from a first position where the by-pass valve port is open to a second position where the by-pass valve port is closed by the valve member. A return spring is mounted in the second section of the valve chamber and has one spring end engaging an end section of the actuator body remote from the piston. The return spring biases the actuator body away from the primary valve seat. A spacer projects from and is connected to the one end of the actuator body, this spacer forming a piston-receiving passage into which the piston extends during use of the by-pass valve. Extension of the piston through the passage by a predetermined amount causes an end of the piston to engage the housing at or near one end of the chamber. The passage has a length and, during use of the by-pass valve, the spacer acts to maintain the one end of the actuator body at least this length of the passage away from the end of the chamber.

According to a further embodiment of the valve of this disclosure, a thermal by-pass valve for a heat exchange circuit includes a valve housing forming a valve chamber and having at least three external ports for the flow of oil into and out of the chamber and to and from a heat exchanger and an internal by-pass port surrounded by a primary valve seat and positioned between first and second sections of the valve chamber. Two of the external ports open into the first section of the chamber and at least one of the external ports opens into the second section. A thermally sensitive actuator mechanism includes an actuator body and a piston slidably mounted in the actuator body at one end thereof and adapted to move from a retracted position to an extended position when the actuator body is heated to a predetermined temperature by surrounding heat exchange fluid during operation of the by-pass valve. The actuator body is mounted in the first section of the chamber. The actuator mechanism further includes a sleeve extending from and connected to the one end of the actuator body, this sleeve forming a piston- receiving passage into which said piston extends during use of the by-pass valve. Extension of the piston through the passage by a predetermined amount causes an end of the piston to engage the housing at or near one end of the chamber. A valve member is operably mounted on the actuator body so as to be movable by the extension of the piston from a first position where the by-pass port is open to a second position where the by-pass port is closed by the valve member. During use of the by-pass valve, the sleeve acts to maintain the one end of the actuator body at least the length of the passage away from the end of the chamber.

In an exemplary version of this by-pass valve, the actuator mechanism includes an annular valve portion extending around the sleeve and the piston and attached to the actuator body at the one end thereof. This valve portion extends radially outwardly relative to a central longitudinal axis of the piston and is movable by the actuator between a valve closed position where flow between the two external ports opening into the first section is blocked and a valve open position where flow of heat exchange fluid between these two ports can take place.

These and other aspects of the disclosed thermal by-pass valve will become more readily apparent to those having ordinary skill in the art from the following detailed description taken in conjunction with the drawings provided herewith.

BRIEF DESCRIPTION OF THE DRAWINGS

So those having ordinary skill in the art to which the present disclosure pertains will more readily understand how to make and use the subject invention, exemplary embodiments thereof will be described in detail herein below with reference to the drawings, wherein.

DETAILED DESCRIPTION OF EXEMPLARY EMBODIMENTS

In the detailed description which follows, exemplary embodiments are described, particularly with reference to the figures appended hereto. However, the particularly disclosed embodiments are merely illustrative thermal by-pass valves for a heat exchange circuit according to the present disclosure.

Figure 1:
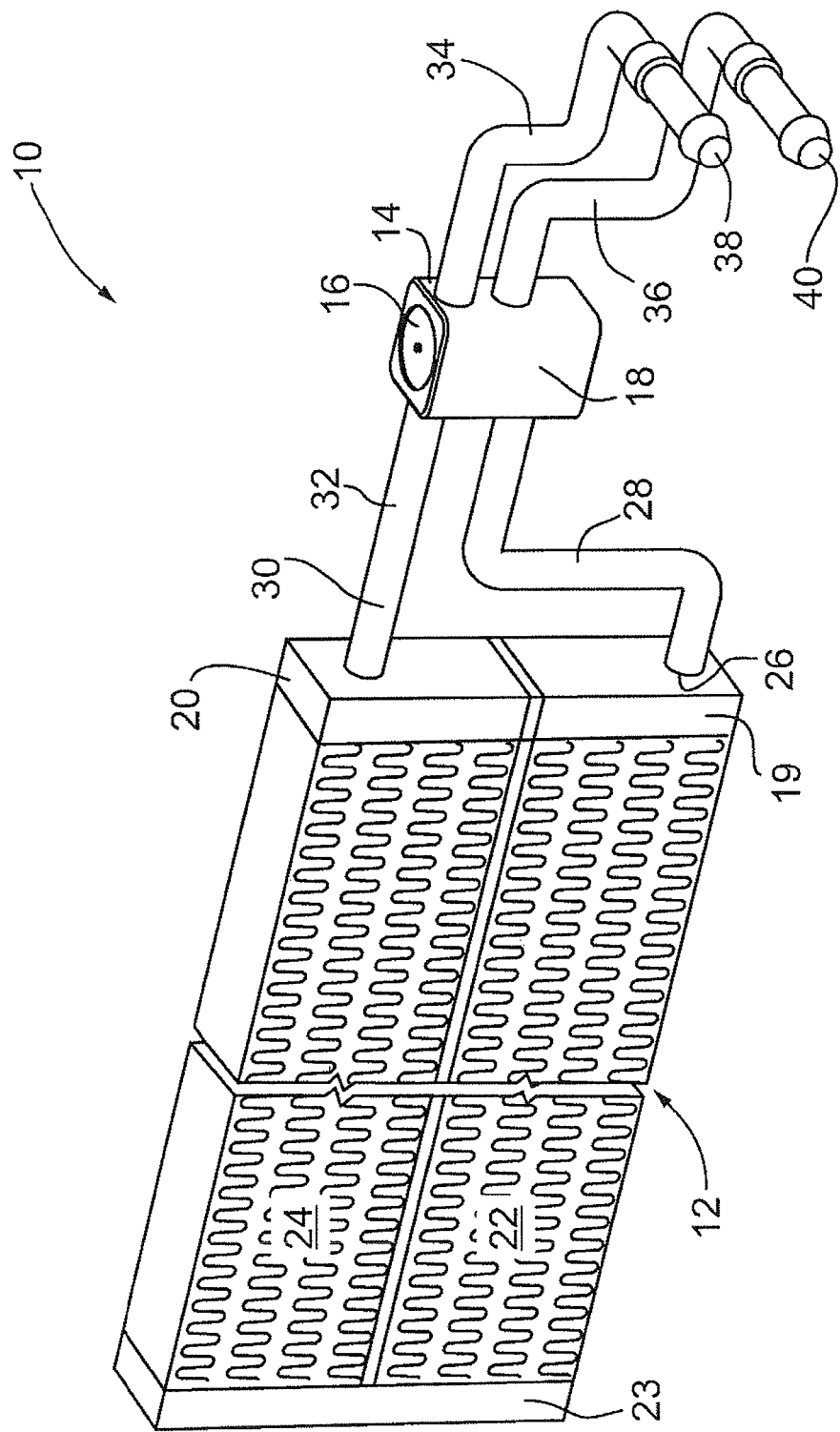
FIG. 1 is a perspective, schematic view of a heat exchanger employing one embodiment of a by-pass valve according to the present invention.

Referring now to the figures, wherein like reference numerals identify similar structural elements of the apparatus and valve, FIG. 1 illustrates a heat exchange circuit 10, which includes a heat exchanger 12 and one embodiment of a thermal by-pass valve 14 shown with its housing cap 16 at the top of valve housing 18. Any type of heat exchanger can be used with the present invention. A typical two pass heat exchanger is shown in both of FIGS. 1 and 2 and has a first manifold 19 which is an inlet manifold and a second manifold 20 which is an outlet manifold. A plurality of spaced-apart heat exchange conduits 22, 24 are connected between the manifolds, so, for example, the heat exchange fluid, for example oil, flows from the inlet manifold 19 through conduits 22 into a return manifold 23 where it reverses direction and comes back through conduits 24 to the outlet manifold 20. However, it will be appreciated that the heat exchanger could be straightened to become a single pass heat exchanger with manifolds 19 and 20 located at opposite ends thereof.

The first manifold 19 is formed with an inlet opening 26 and an inlet conduit 28 is connected to communicate with this opening. The outlet manifold is formed with an outlet opening 30 and an outlet conduit 32 is connected to communicate with this outlet opening. The conduits 28, 32 are connected to inlet and outlet ports in the by-pass valve 14. Supply conduits 34, 36 are also connected to external ports in the by-pass valve 14 and these can have end fittings 38, 40 for attaching flow lines to the conduits. Where the heat exchanger 12 is used as a transmission oil cooler, the end fittings 38, 40 can be hose barbs for attaching rubber hoses between the transmission and the heat exchange circuit. However, any type of end fittings 38, 40 can be used to suit the type of oil lines running to and from the heat exchange circuit 10. The by-pass valve 14 is referred to as a four port by-pass valve because four conduits 28, 32, 34 and 36 are connected to the valve.

Figure 2:
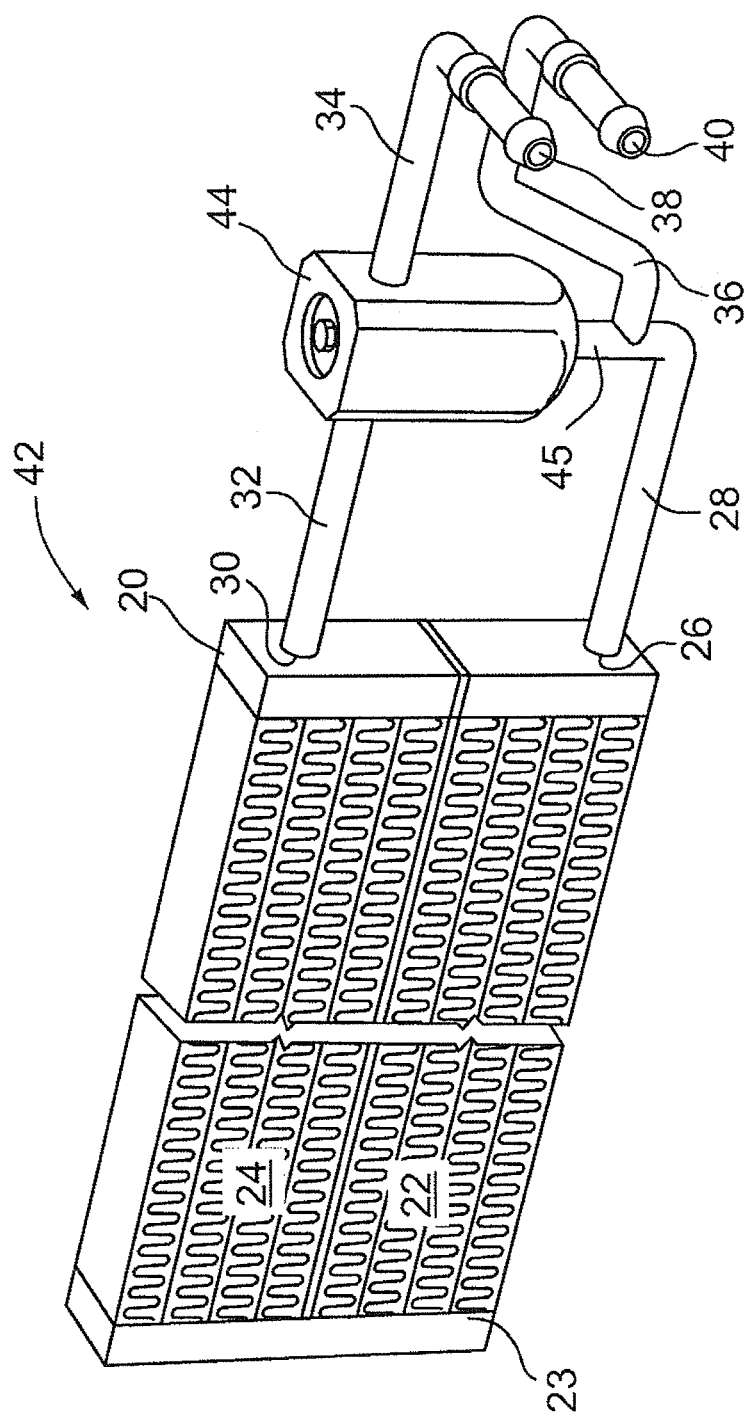
FIG. 2 is a perspective view similar to FIG. 1, but showing another embodiment of a by-pass valve according to the present invention.

FIG. 2 is similar to FIG. 1 and similar reference numerals have been used. However the heat exchange circuit 42 of FIG. 2 has a by-pass valve 44 which is referred to as a three port by-pass valve because it has a single conduit 45 coming out of it that communicates with the conduits 28, 36, the purpose of which will be described below.

Figure 4:
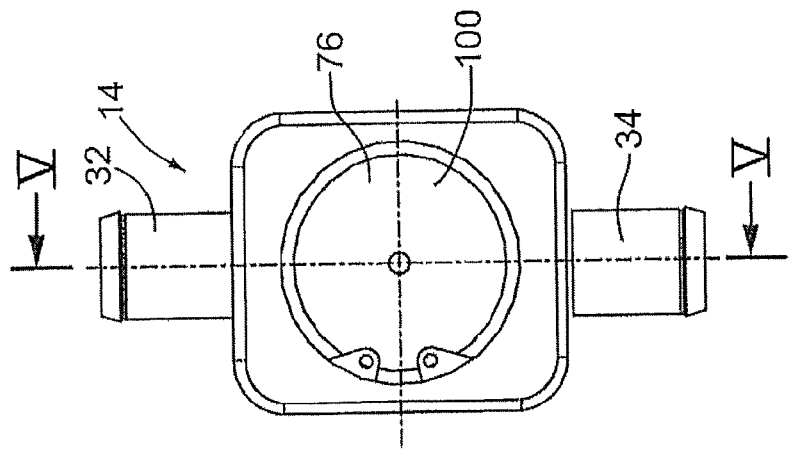
FIG. 4 is an end view of the thermal by-pass valve of FIG. 3, this view is showing the cap end of the housing.
Figure 3:
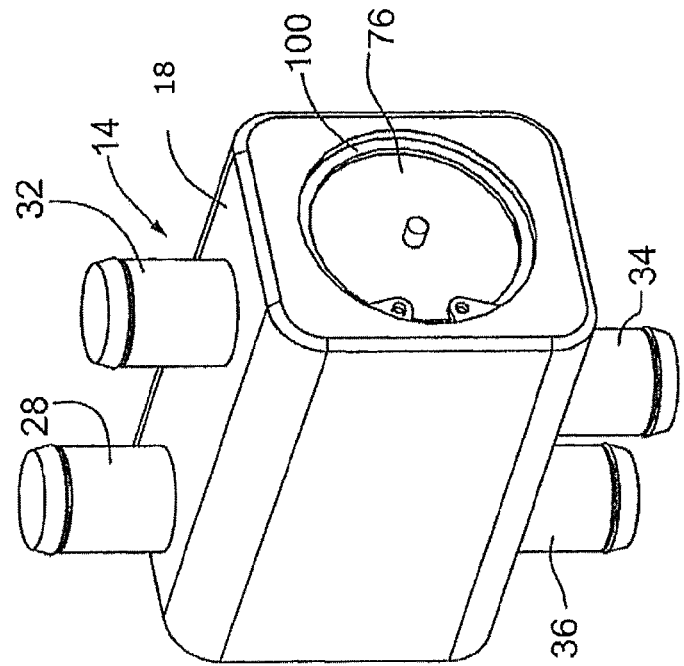
FIG. 3 is an isometric view of the by-pass valve used in the heat exchange circuit of FIG. 1, this view showing the two ends of the valve housing extending vertically and showing a cap end portion of the housing as well as a longitudinal side.
Figure 5:
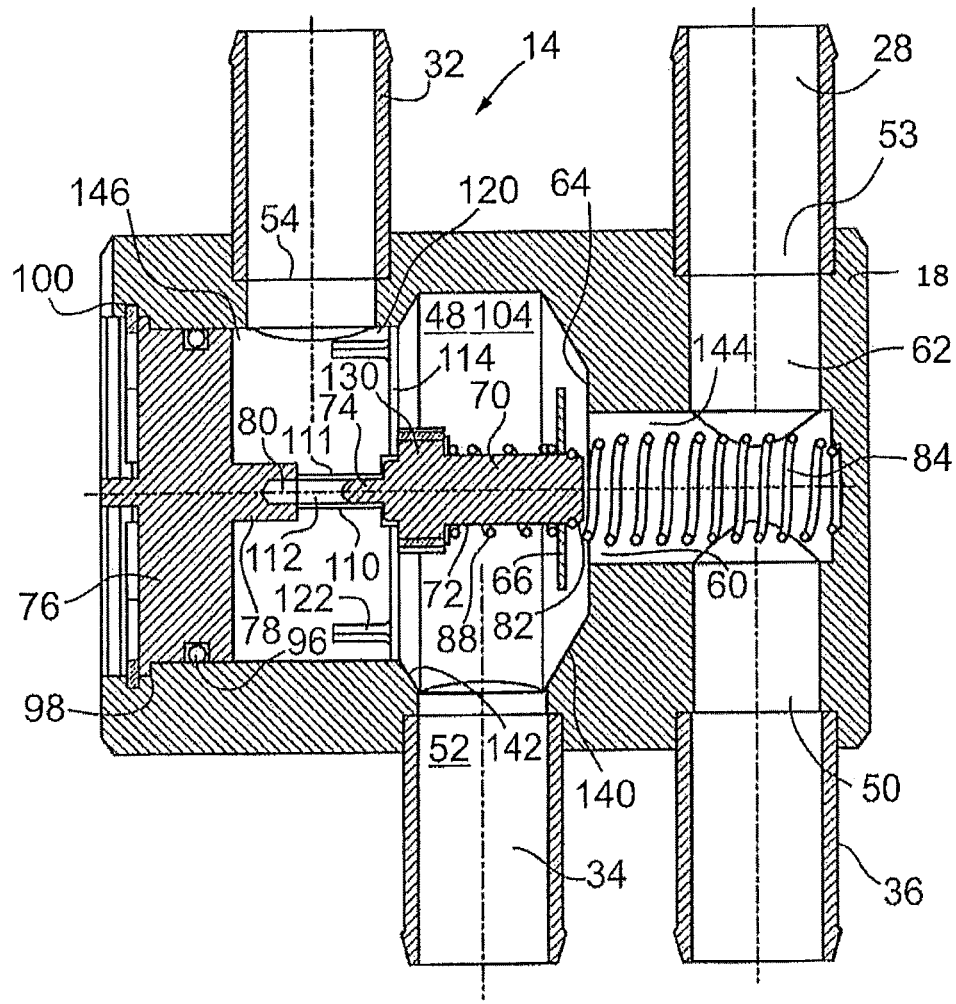
FIG. 5 is an axial cross section of the thermal by-pass valve taken along the line V-V of FIG. 4.

Referring next to FIGS. 3 to 5, the four port by-pass valve 14 is shown and this thermal by-pass valve has a valve housing 18 defining a valve chamber 48 which can be seen in FIG. 5. The housing has four ports as indicated including a first port 50 for the oil supply line, a second port 52 to which the oil return line is connected, a third port 53 to which a heat exchanger supply line is connected, and a fourth port 54 to which a heat exchange return line can be connected. All four of these ports communicate with the valve chamber 48. The valve housing also has a by-pass valve port 60 which communicates with the two ports 50, 53 that are themselves connected to each other by internal valve conduit 62. The by-pass valve port is surrounded by a primary valve seat 64 formed by an internal, annular wall of the housing. It will be seen that the valve port 60 is located in the valve chamber and provides fluid communication between the first port 50 and the second port 52 when the valve port is open (as shown in FIG. 5). An annular valve member 66 is mounted in the chamber and is adapted to engage the valve seat 64 to open and close the valve port 60.

Figure 7:
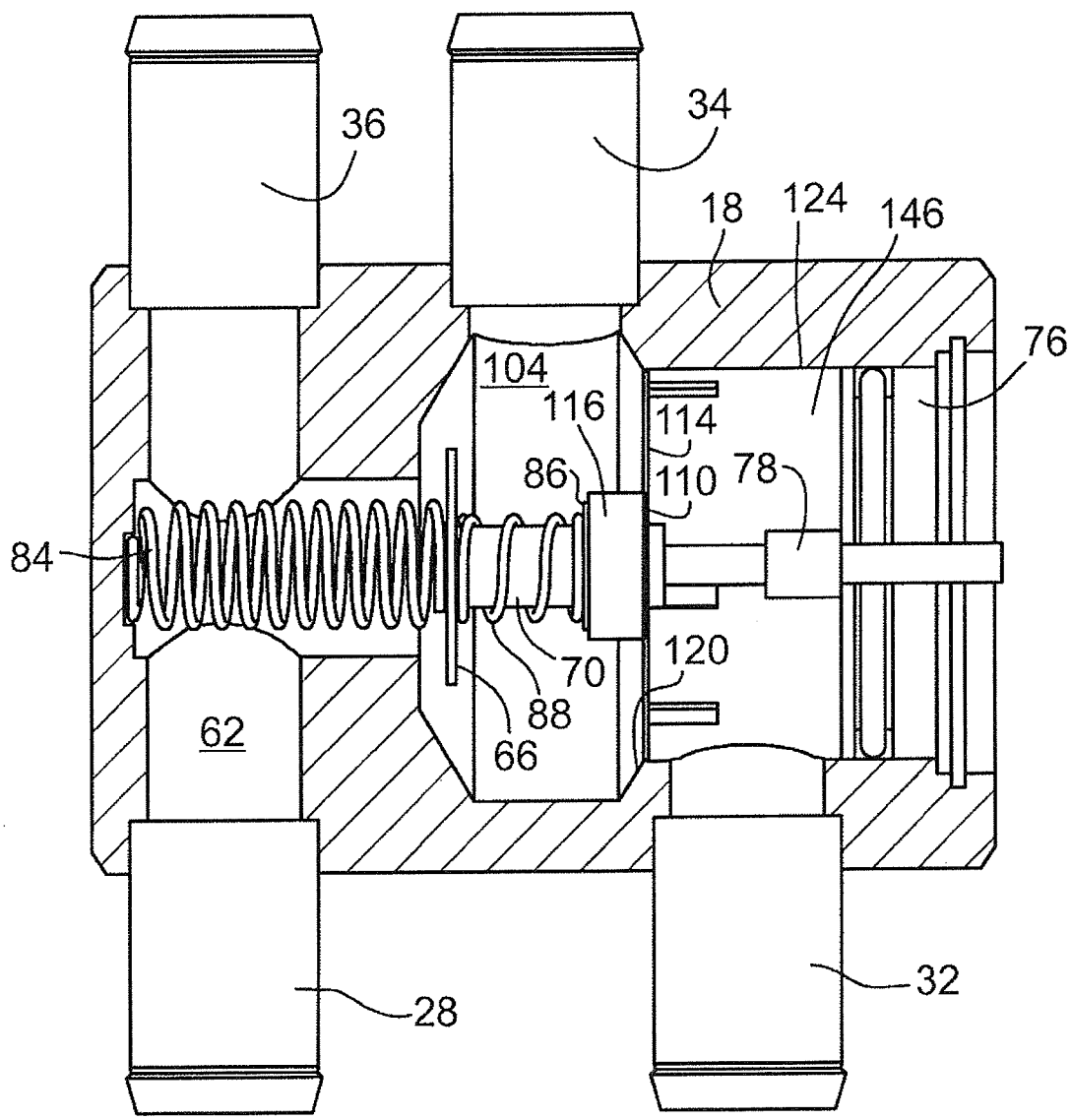
FIG. 7 is a see through side view of the thermal by-pass valve of FIG. 5, this view showing the valve in the by-pass mode.
Figure 8:
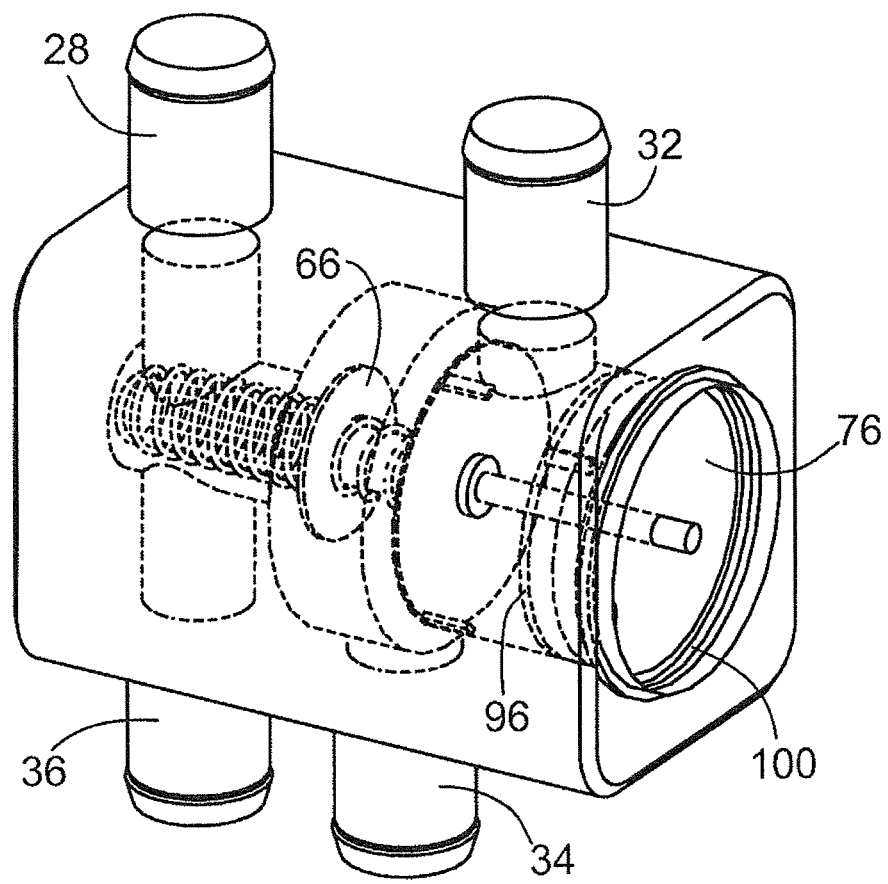
FIG. 8 is a see through perspective view of the thermal by-pass valve of FIG. 5.

A thermally sensitive actuator 70 (which can also be referred to as a temperature responsive actuator) is located in the chamber 48 and is operably coupled to the valve member 66 to move the valve member thereby opening and closing the valve port 60. The actuator 70, which is sometimes referred to as a thermal motor, can be a piston and cylinder type device wherein the cylinder is filled with a thermally sensitive material, such as wax that expands and contracts causing the actuator to extend axially upon being heated to a predetermined temperature and to retract upon being cooled below this predetermined temperature. In one particular embodiment where the by-pass valve 14 is used in conjunction with an automotive transmission oil cooler, the predetermined temperature is such that the oil returning to the transmission from the heat exchange circuit is about 80° C. The illustrated actuator includes an actuator body having a shaft section 72 and a movable piston 74 extending from one end of the actuator body. As shown in FIGS. 5, 7 and 8, the actuator is mounted in the chamber 48 and is movable therein in response to extension or retraction of the piston 74. The piston is extendible in order to engage the housing at or near one end of the chamber. In the particular illustrated embodiment, the piston is extendable when the actuator body reaches a predetermined temperature to engage an inward extension of a valve cap 76 which can be considered for purposes of this application part of the valve housing 18. In the exemplary embodiment shown in FIG. 5, an axially inwardly extending central projection 78 of the cap is formed with end recess 80, into which an end section of the piston 74 can extend.

Figure 6:
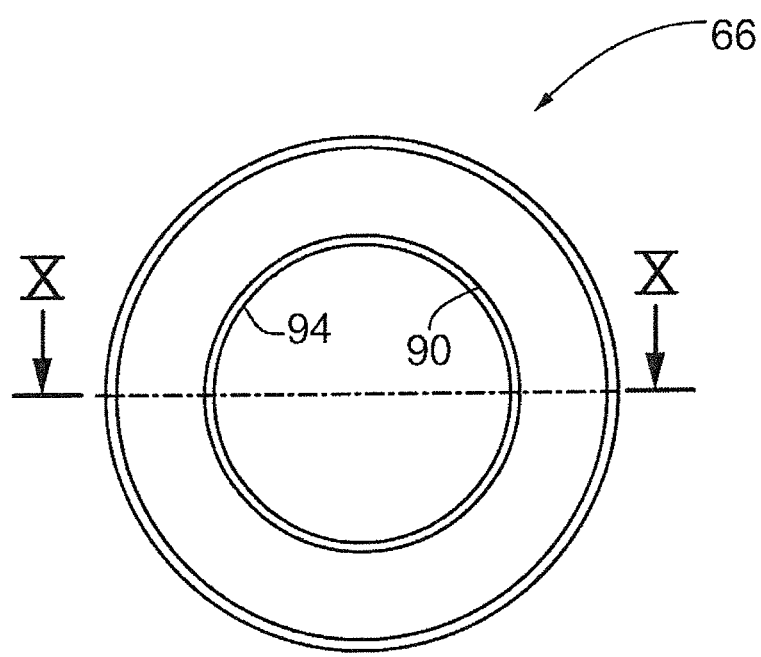
FIG. 6 is a plan view of an annular ring used as a valve member in the by-pass valve of FIG. 3.
Figure 9:
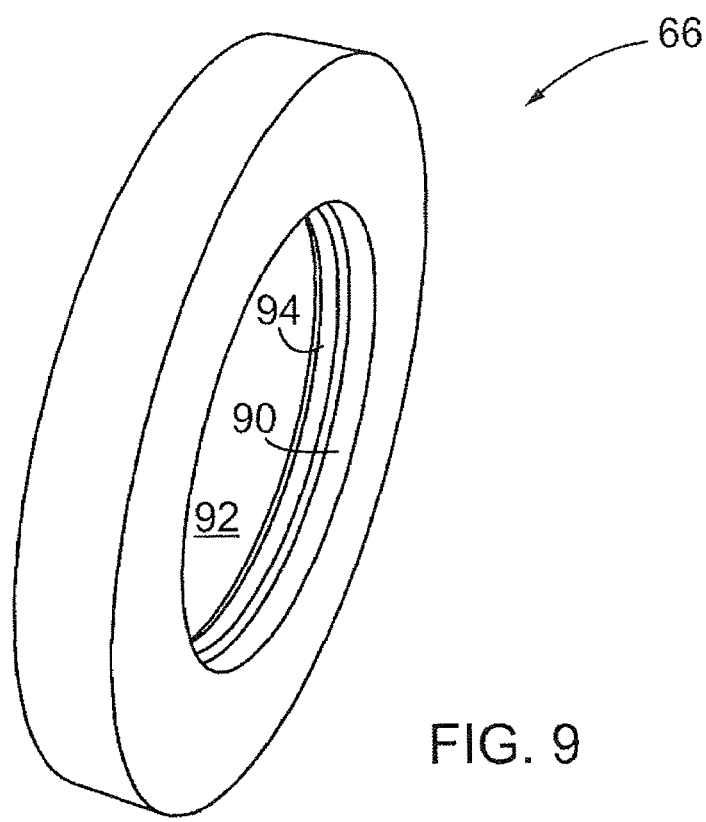
FIG. 9 is a perspective view of the annular ring of FIG. 6.
Figure 10:
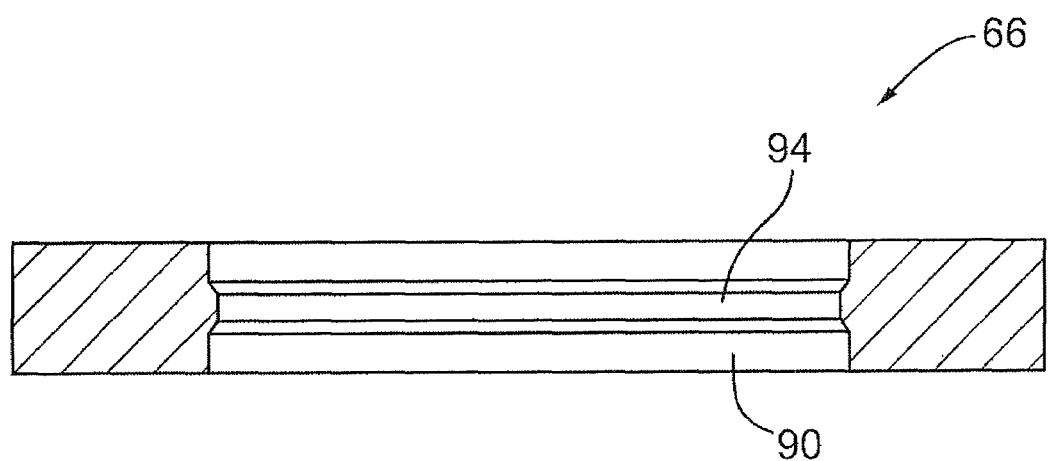
FIG. 10 is a sectional view of the annular ring taken along the line X-X of FIG. 6.

The shaft section 72 is disposed along the central axis of the valve port 60 and it has a closed end portion 82 that partially closes the valve port 60. The valve member 66, which is in the form of an annular ring that is clearly shown in FIGS. 6, 9 and 10, is located adjacent to the closed end portion 82 in its normal or rest position as shown in FIG. 5 and FIG. 7. It extends radially outwardly or transversely from the shaft section and thus, when the piston 74 is extended can engage the valve seat 64 to completely close valve port 60. Thus, the annular valve member 66 and the closed end portion 82 form a reciprocating plug which moves along the central axis to open and close the valve port.

It will be understood that the valve member 66 is slidably mounted on the shaft section 72. A return spring 84 is mounted in the valve housing and has one spring end engaging the shaft section 72 so as to bias the shaft section away from the valve seat 64. In a manner known per se, the inner end of the return spring is attached to the closed end portion 82 by being located in a groove formed in a closed end portion. The return spring also acts as a stop for preventing the valve member from sliding off the shaft section. The shaft section includes an inner annular shoulder 86 and an override coil spring 88 is mounted on the shaft section 72. One end of this spring 88 engages the valve member 66 so as to bias the valve member towards the primary valve seat 64. The other end of the spring 88 rests against the shoulder 86 (see FIG. 7).

The illustrated exemplary valve cap 76 has a circular circumference and is inserted into an end portion of the substantially cylindrical cavity that forms the main or first section of the valve chamber. The cap has an O-ring seal 96 and is held in position by engaging an annular shoulder 98 of the housing and an opposing snap ring or "C-clip 100" (best shown in FIG. 8).

As will be known to those skilled in the art, when the temperature inside the chamber 48 drops below the predetermined temperature for the actuator, the piston 74 is able to retract into the actuator body and it is urged to retract into the actuator body by the return spring 84. This retraction will cause the valve member 66 to lift off the valve seat 64, thereby opening the valve port 60. When the valve port is open as indicated in FIG. 5, the return spring extends through the valve port and into a relatively wide section 104 of the chamber but it does not materially affect the flow through the valve port 60.

It will be understood that the valve cap 76, the actuator 70, the coil spring 88, the valve member 66 and the return spring 84 form a cartridge or sub assembly for the by-pass valve. When the sub assembly is removed from the by-pass valve, the various conduits can be attached, such as by brazing to the housing, without damaging the actuator or the springs. The cartridge can then be installed in the housing 18 and the cap locked in the illustrated position by the C-clip so that the heat exchange circuit will be ready to use.

Figure 11:
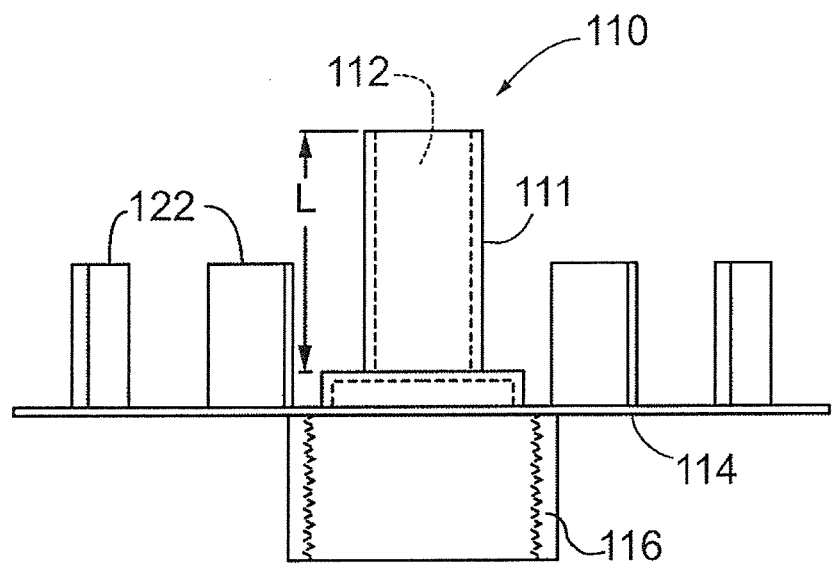
FIG. 11 is a side view of the spacer member used in the by-pass valve of FIG. 5.

The by-pass valve includes a spacer member 110 projecting from and connected to one end of the actuator body. In particular it extends from the same end of the actuator body as the piston 74 with which it is coaxial. The spacer member forms a piston-receiving passage 112 into which the piston extends during use of the valve. The piston is slidable in this passage and, when fully extended can extend entirely though the passage into the recess 80 formed in the cap. The spacer member used in the by-pass valve of FIG. 5 is shown separately in FIG. 11 wherein the length L of the passage 112 is indicated. During use of the valve, the spacer member acts to maintain the adjacent end of the actuator body at least this length L away from the end of the valve chamber.

An exemplary form of the spacer member is in fact a combined spacer and valve device for use with the thermal by-pass valve. This combined device includes a sleeve section 111 which forms the passage 112 that is adapted to receive the piston. There is also an annular plate section 114 connected to one end of the sleeve section, extending circumferentially around the sleeve section, and forming a valve portion of the device. The combined device further includes a connecting section 116 joined to the plate section on a side thereof opposite the sleeve section and capable of attaching the combined device to the adjacent end of the actuator body. During use of the combined device in the by-pass valve, the valve portion 114 is movable by the actuator 70 between a closed position shown in FIG. 5 where flow of the heat exchange fluid (or oil) between the two ports 54, 52 is substantially blocked by the valve portion and an open position where flow between these two ports can take place.

To explain further the exemplary by-pass valve shown has a further valve port 120 located between the second port 52 and the fourth port 54 and it is this second port that can be opened or closed by axial movement of the plate section 114 of the spacer member. In order to guide the axial movement of the plate section, there can be provided several guide posts 122 which are integrally formed on the plate section and which are spaced from but parallel to the sleeve section 111. In one exemplary embodiment there are four of these guide posts distributed evenly about the circumference of the plate section. It will be understood that the guide posts engage a cylindrical wall 124 which defines the circumference of the valve chamber in the section through which the sleeve section 111 extends. As indicated, the valve chamber has a wide section 104 having a diameter greater than that of the chamber section formed by the wall 124. Extension of the piston 74 into the end recess 80 will cause the plate section 114 to move axially away from the port 120 and into the wide section 104 of the chamber, thereby permitting heat exchange fluid to flow between the two ports 54, 52. This flow is allowed by the fact that the valve chamber is wider in the section 48.

As shown in FIG. 5, the actuator 70 has an enlarged head section 130 at its piston end. This head section which has a substantially cylindrical exterior has a diameter greater than the diameter of the cylindrical shaft section 72. The override spring 88 engages the shoulder formed by this head section at one end. In the embodiment of FIG. 5, the connecting section 116 is an internally threaded cylindrical section which is threaded onto an end section of the actuator, namely the enlarged head section 130. By using a threaded connection, it is possible to readily detach the spacer member from the actuator when required. However other forms of attachment between the end section of the actuator and the spacer member are possible. In particular it is possible to permanently attach the spacer member to the head of the actuator by a crimping operation, by welding, or even by use of a suitable adhesive.

Figure 12:
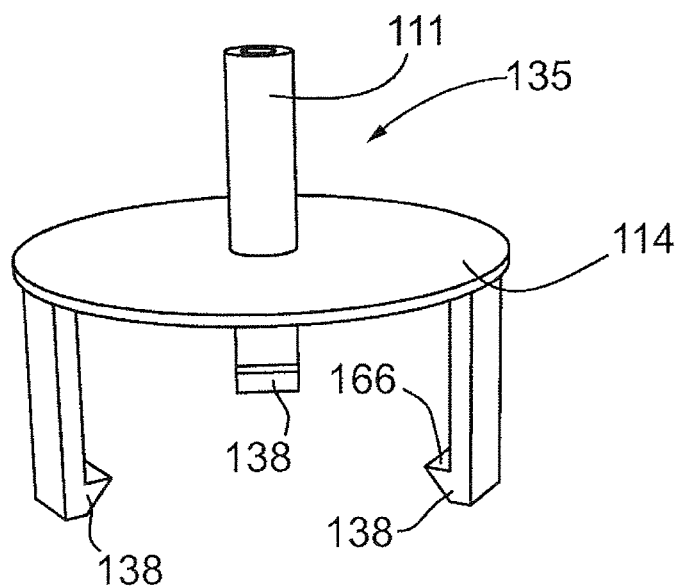
FIG. 12 is a schematic perspective view of one embodiment of a spacer member that can be attached to the actuator of the by-pass valve.
Figure 13:
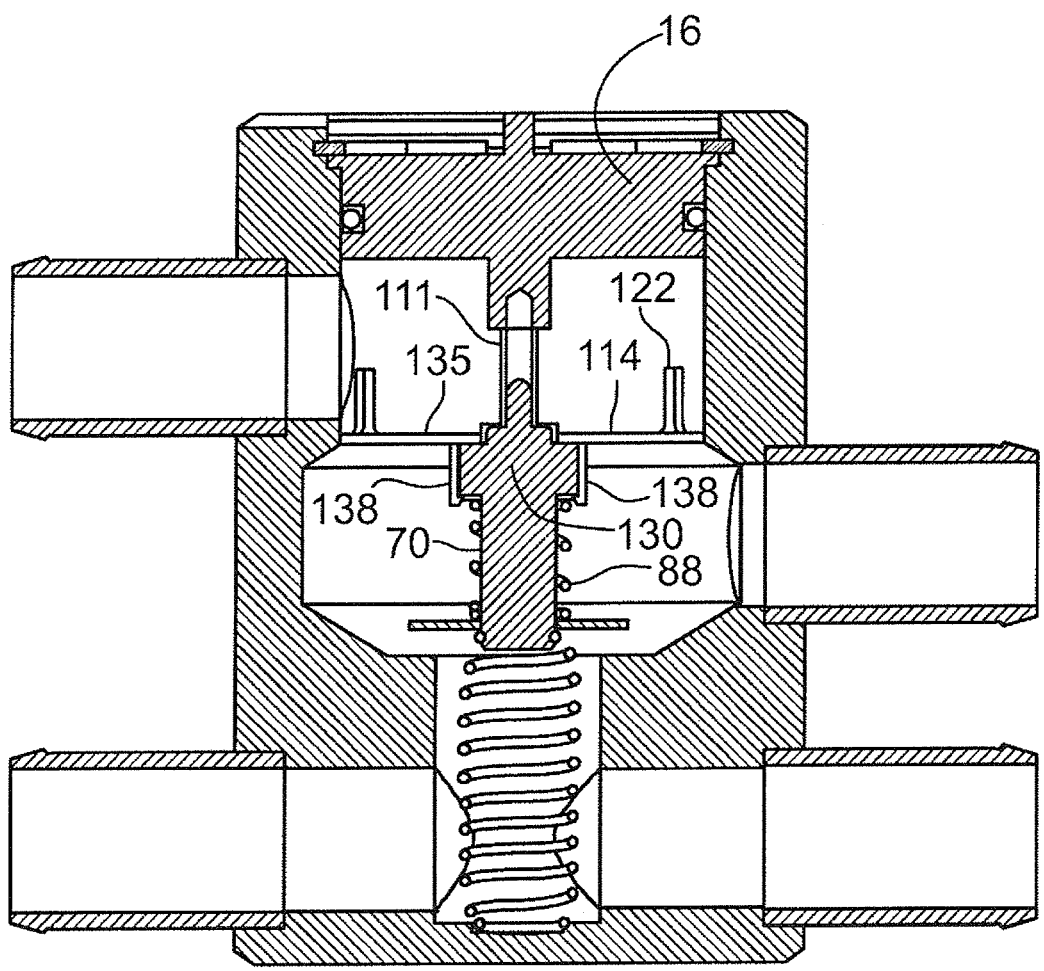
FIG. 13 is an isometric detail view showing the spacer member of FIG. 12 mounted on an end section of a thermally sensitive actuator mounted in the valve chamber.

Another form of detachable connection between the end section of the actuator and a spacer member is illustrated by FIGS. 12 and 13. FIG. 12 illustrates separately an alternate combined spacer and valve device indicated generally at 135. This device has a sleeve section 111 similar to the spacer member used in the embodiment of FIG. 5 and it also has a similar plate section 114 with a circular periphery. Extending in the same direction as the sleeve section and parallel thereto can be several guide posts similar to those shown on FIG. 5 and serving the same function. These posts are not shown in FIG. 12 but are shown in part in FIG. 13. Extending from the side of the plate section opposite the sleeve section are several resilient hook members 138. These can be integrally formed on the plate section 114 and evenly distributed around the circumference of the plate section. The free end of each hook member is formed with a short end-flange or hook 166.

The washer-like annular valve member shown in FIGS. 6, 9 and 10 can be formed from a synthetic material such as plastic. For example, for various applications suitable materials for this member can be polyamide 4/6 or polyamide 66, although other suitable nylons and plastics can be used. The annular valve member has a substantially smooth cylindrical inner surface 90 defining a central opening 92 through which the shaft section of the actuator extends. A circumferential inwardly extending wiper or rib 94 protrudes inward from a mid-point of the surface 90 for slidably engaging the outer surface of the shaft section. An exemplary form of the rib 94 has a thickness which is a fraction of that of the valve member itself. In particular, the rib 94 can be 1/3 to 1/7 of the thickness of the valve member 66. The illustrated valve member is a unitary structure with the rib being formed integrally with, and from the same material as, the rest of the valve member.

It will be seen from FIG. 5 that the valve chamber formed by the valve housing has several sections of different widths and a couple of these sections have been described above. The wide section 104 as shown has a tapered end portion 140 in the region of the valve member 66 and it has a further tapered portion 142 adjacent the further valve port 120. At one end of the wide section 104, is a relatively narrow end section 144 through which the return spring 84 extends. This end section can be considered a first end section of the valve chamber. The portion of the valve chamber through which the sleeve section 111 extends can be considered a second end section 146 and it is this section which is defined by the aforementioned cylindrical wall 124. The second end section is adjacent the fourth port 54 and it has a larger diameter than the first end section 144. The wide section 104 can be considered the central section of the chamber and this section is adjacent the second port 52 and contains the actuator. As indicated, this central section has a transverse width greater than the diameter of the second end section 146, It will be appreciated by those skilled in the construction of thermal by-pass valves that rather than having a separate spacer and valve device as illustrated in FIG. 5, it is possible to provide the sleeve and the annular valve plate portion as integral extensions of the actuator body itself and not as a separate member. In particular, the enlarged head section 130 of the actuator, sleeve section 111 and plate section 114 can be molded or formed as an integral, one piece member, if desired. This member can then be attached to the remaining portion of the actuator body during manufacture of the actuator.

Figure 14:
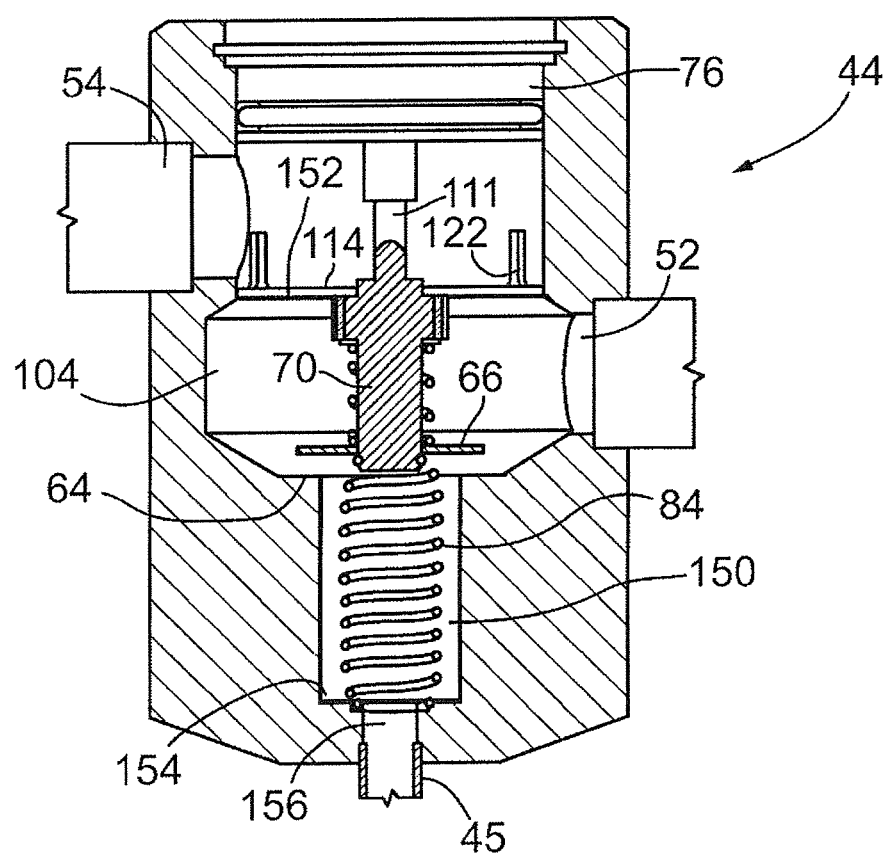
FIG. 14 is an axial cross-sectional view of a three port by-pass valve with internal valve components not shown in cross-section for ease of illustration.

FIG. 14 illustrates the internal layout and components of the aforementioned three port by-pass valve constructed according to the present disclosure. Except for the differences noted hereinafter, the by-pass valve 44 is similar to the by-pass valve 14 described above and illustrated in FIG. 5. However, in this embodiment, the single conduit 45 communicates with the end section 150 of the valve chamber. When the by-pass valve member 66 is in the open position, oil from the transmission, for example, can flow from the conduit 36 and upwardly through the conduit 45 and through the valve port. The oil can then flow through the main, wide section 104 of the valve chamber and exit the valve through the port 52. When the valve member 66 is in the closed position, so that there is no by-pass flow, oil coming from the transmission through the conduit 36 flows into the conduit 28 and through the heat exchanger to be returned to the transmission through the conduits 32, 34 as in the case of the by-pass valve 14.

FIG. 14 shows the three port by-pass valve 44 provided with a combined spacer and valve device 152, this device having a sleeve section 111 and a plate section 114. As shown, when the valve member 66 is in the open position, the plate section 114 can block passage of oil from the port 54 to the port 52. In this embodiment, as in the valve 14 of FIG. 5, the port 52 is located lower (as shown in FIG. 14) in the valve chamber than the port 54 in order to allow the plate section 114 to act as a second valve member.

In the version of FIG. 14, one end of the return spring 84 rests against an annular shoulder 154 formed by the valve housing. This shoulder extends around a third external port 156 to which the conduit 45 is connected.

The by-pass valves have been described above for use with an automotive transmission oil cooler as the heat exchanger, but these by-pass valves can be used with any other type of heat exchanger, such as a fuel cooling heat exchanger, and for non-automotive applications as well. Other types of thermal actuators can be used than a wax-type actuator.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:

1. A thermal by-pass valve for a heat exchange circuit, comprising:
    a valve housing forming a valve chamber and having a first port for an oil supply line, a second port for an oil return line, a third port for a heat exchanger supply line and a fourth port for a heat exchanger return line, said first, second, third and fourth ports communicating with said chamber, and further having a by-pass valve port surrounded by a primary valve seat, said valve port being located in said chamber and providing fluid communication between said first and second ports when said valve port is open, said valve housing including a housing cap closing one end of said valve chamber;
    a thermally sensitive actuator including an actuator body having a shaft section and a movable piston extending from one end of said actuator body, said actuator being mounted in said chamber and movable therein in response to extension or retraction of said piston, said piston being extendible in order to engage said housing at or near one end of said chamber;
    a valve member mounted on said shaft section and movable by extension of said piston from a first position where said valve port is open to a second position wherein said valve port is closed by said valve member sealingly engaging said valve seat;
    a return spring mounted in said housing and having one spring end engaging said shaft section so as to bias said shaft section away from said valve seat and to move said actuator away from said valve seat upon retraction of said piston; and
    a spacer member separate from said housing cap projecting from the actuator body and coaxial with said piston, said spacer member including a sleeve section forming a piston-receiving passage, into which said piston extends during use of the by-pass valve, and a connection section connecting said spacer member to an end section of the actuator body, said piston being slidable in said passage, wherein said passage has a length and, during use of said valve, said spacer member acts to maintain said one end of the actuator body at least said length of the passage away from said one end of the chamber,
    wherein said spacer member includes an annular plate section extending circumferentially around said sleeve section and forming a valve portion, and wherein said plate section is movable by said actuator between a valve closed position where flow of oil between said fourth port and said second port is blocked and a valve open position where flow of oil from said fourth port to said second port can take place.

2. The thermal by-pass valve according to claim 1 wherein said actuator has an enlarged head section at said one end of the actuator, said head section having a diameter greater than diameter of said shaft section, and said valve housing has a further valve port located between said second port and said fourth port, and said spacer member is movable by extension of said piston from a closed position where said further valve port is closed by the spacer member to a position where said further valve port is open to allow oil to flow from the fourth port to said second port.

3. The thermal by-pass valve according to claim 2 including an override spring mounted on said shaft section and having one end thereof engaging said valve member so as to bias said valve member towards said primary valve seat.

4. The thermal by-pass valve according to claim 1 wherein a flow passage extends between said first port and said third port and is formed by said valve housing and said return spring extends across said flow passage whereby another end of the return spring engages an internal surface of the housing.

5. The thermal by-pass valve according to claim 1 wherein said valve housing includes a valve cap and a main body of the housing in which said valve cap is detachably mounted, said valve cap has a central recess formed in an inside surface thereof and aligned with a central longitudinal axis of said piston, and said piston extends into said recess when said piston is fully extended 6. The thermal by-pass valve according to claim 1 wherein said valve chamber includes a relatively narrow first end section through which said return spring extends, a second end section adjacent said fourth port which has a larger diameter than said first end section, and a central section adjacent said second port and containing said actuator, said central section having a transverse width greater than the diameter of said second end section.

7. A thermal by-pass valve for a heat exchange circuit, comprising:
    a valve housing forming a valve chamber and having a first port for an oil supply line, a second port for an oil return line, a third port for a heat exchanger supply line and a fourth port for a heat exchanger return line, said first, second, third and fourth ports communicating with said chamber, and further having a by-pass valve port surrounded by a primary valve seat, said valve port being located in said chamber and providing fluid communication between said first and second ports when said valve port is open;
    a thermally sensitive actuator including an actuator body having a shaft section and a movable piston extending from one end of said actuator body, said actuator being mounted in said chamber and movable therein in response to extension or retraction of said piston, said piston being extendible in order to engage said housing at or near one end of said chamber;
    a valve member mounted on said shaft section and movable by extension of said piston from a first position where said valve port is open to a second position wherein said valve port is closed by said valve member sealingly engaging said valve seat;
    a return spring mounted in said housing and having one spring end engaging said shaft section so as to bias said shaft section away from said valve seat and to move said actuator away from said valve seat upon retraction of said piston; and
    a spacer member projecting from and connected to said one end of the actuator body and coaxial with said piston, said spacer member including a sleeve section forming a piston-receiving passage into which said piston extends during use of said by-pass valve, an annular plate section extending around said sleeve section and a connection section joined to and extending from said plate section and connecting the spacer member to an end section of said actuator body, wherein said plate section is sized and arranged to act as a further valve device movable by said actuator between a closed position where flow between said fourth port and said second port is blocked and an open position where flow of oil from said fourth port to said second port can take place, wherein said piston is slidable in said passage, which has a length, and during use of said valve, said spacer member acts to maintain said one end of the actuator body at least said length of the passage away from said one end of the chamber.

8. The thermal by-pass valve according to claim 7 wherein said connecting section is an internally threaded cylindrical section threaded on to an end section of said actuator.

9. The thermal by-pass valve according to claim 7 wherein said spacer member has guide members mounted around an outer periphery of said plate section and acting to guide movement of said spacer member between said closed and open positions.

10. A thermal by-pass valve for a heat exchange circuit, comprising
a valve housing forming a valve chamber and a by-pass valve port surrounded by a primary valve seat, said valve port being located between first and second sections of the valve chamber, first and second fluid ports opening into the first section of the valve chamber and a third fluid port opening into said second section, said valve housing including a housing cap closing one end of said valve chamber;
a thermally sensitive actuator mounted in said first section of the valve chamber and having an actuator body and an extendible piston located at one end of the actuator body, said actuator body being movable in said chamber in response to extension of said piston when said actuator body is heated to a predetermined temperature by surrounding heat exchange fluid during operation of said by-pass valve and in response to retraction of said piston;
a valve member operatively mounted on said actuator body so as to be movable by extension of said piston from a first position where said by-pass valve port is open to a second position where said by-pass valve port is closed by said valve member;
a return spring mounted in said second section of the valve chamber and having one spring end engaging an end section of the actuator body remote from said piston, said return spring biasing said actuator body away from the primary valve seat; and
a spacer member separate from said housing cap projecting from the actuator body, said spacer member including a sleeve section forming a piston-receiving passage into which said piston extends during use of the by-pass valve, sliding of said piston through said passage by a predetermined amount causing an end of said piston to engage said housing at or near one end of said chamber, said spacer member also including a connecting section attaching said spacer member to said one end of the actuator body,
wherein said passage has a length and, during use of said by-pass valve, said spacer member acts to maintain said one end of the actuator body at least said length of the passage away from said end of the chamber,
wherein said spacer member includes an annular plate section extending circumferentially around said sleeve section and forming a valve portion, and wherein said plate section is movable by said actuator between a valve closed position where flow of oil between said fourth port and said second port is blocked and a valve open position where flow of oil from said fourth port to said second port can take place.

11. A thermal by-pass valve for a heat exchange circuit, comprising:
a valve housing forming a valve chamber and a by-pass valve port surrounded by a primary valve seat, said valve port being located between first and second sections of the valve chamber, first and second fluid ports opening into the first section of the valve chamber and a third fluid port opening into said second section;
a thermally sensitive actuator mounted in said first section of the valve chamber and having an actuator body and an extendible piston located at one end of the actuator body, said actuator body being movable in said chamber in response to extension of said piston when said actuator body is heated to a predetermined temperature by surrounding heat exchange fluid during operation of said by-pass valve and in response to retraction of said piston;
a valve member operatively mounted on said actuator body so as to be movable by extension of said piston from a first position where said by-pass valve port is open to a second position where said by-pass valve port is closed by said valve member;
a return spring mounted in said second section of the valve chamber and having one spring end engaging an end section of the actuator body remote from said piston, said return spring biasing said actuator body away from the primary valve seat; and
a separate spacer member projecting from and connected to said one end of the actuator body, said spacer member having a sleeve section which forms a piston receiving passage into which said piston extends during use of the by-pass valve, an annular plate section extending around said sleeve section and forming a valve portion, and a connecting section that attaches said spacer member to said one end of the actuator body, and wherein said valve portion is movable by said actuator between a closed position where heat exchange fluid flow between said first and second fluid ports is at least substantially blocked and an open position where said heat exchange fluid flow between said first and second fluid ports can take place,
wherein extension of said piston through said passage by a predetermined amount causes an end of said piston to engage said housing at or near one end of said chamber and
wherein said passage has a length and, during use of said by-pass valve, said spacer member acts to maintain said one end of the actuator body at least said length of the passage away from said end of the chamber.

12. The thermal by-pass valve according to claim 11 wherein said connecting section is a cylindrical section attached to a head section of said actuator body, and wherein an override spring is mounted on and extends around a shaft section of the actuator body and has a first spring end engaging said valve member so as to bias said valve member towards said primary valve seat.

13. The thermal by-pass valve according to claim 11 wherein said connecting section comprises a plurality of resilient hook members detachably connected to an enlarged head section of said actuator body, said hook members being distributed around a central longitudinal axis of said sleeve section.

14. The thermal by-pass valve according to claim 11 wherein said valve housing includes a valve cap and a main body in which the valve cap is detachably mounted, said valve cap has a central recess forming in an inside surface thereof and aligned with a central longitudinal axis of said piston, and said piston extends into said recess when said piston is fully extended.

15. A thermal by-pass valve for a heat exchange circuit, comprising:
- a valve housing forming a valve chamber and having at least three external ports for the flow of a heat exchange fluid into and out of said chamber and to and from a heat exchanger and an internal by-pass port surrounded by a primary valve seat and positioned between first and second sections of said valve chamber, two of said external ports opening into said first section of the chamber and at least one of said external ports opening into said second section;
- a thermally sensitive actuator mechanism including an actuator body and a piston slidably mounted in said actuator body at one end thereof and adapted to move from a retracted position to an extended position when said actuator body is heated to a predetermined temperature by surrounding heat exchange fluid during operation of said by-pass valve, said actuator body being mounted in said first section of the chamber, said actuator mechanism further including a sleeve extending from and connected to said one end of the actuator body, said sleeve forming a piston-receiving passage into which said piston extends during use of the by-pass valve, whereby extension of said piston through said passage by a predetermined amount causes an end of said piston to engage said housing at or near one end of said chamber, said actuator mechanism further including an annular valve portion extending around said sleeve and said piston and attached to said actuator body at said one end thereof, said valve portion extending radially outwardly relative to a central longitudinal axis of said piston and being movable by said actuator between a valve closed position where flow between said two external ports opening into the first section is blocked and a valve open position where flow of the heat exchange fluid between these two external ports can take place; and
- a valve member operatively mounted on said actuator body so as to be movable by said extension of the piston from a first position where said by-pass port is open to a second position where said by-pass port is closed by said valve member, wherein said piston-receiving passage has a length, and during use of said by-pass valve, said sleeve acts to maintain said one end of the actuator body at least said length of the passage away from said end of the chamber.

16. The thermal by-pass valve according to claim 15 wherein said actuator mechanism includes a return spring mounted in said second section of the valve chamber and having one end thereof engaging said actuator body at an end of the body remote from said piston so as to bias the actuator body away from said primary valve seat.

17. A combined spacer and valve device for use in a thermal by-pass valve for a heat exchange circuit, said valve having a thermally sensitive actuator with an actuator body and a piston slidably mounted in said actuator body and extendible from one end of said actuator body, said combined spacer and valve device comprising:
- a sleeve section which forms a passage adapted to receive said piston;
- an annular plate section connected to one end of the sleeve section, extending circumferentially around said sleeve section, and forming a valve portion of the device; and
- a connecting section joined to said plate section on a side thereof opposite said sleeve section and capable of attaching said device to said one end of the actuator body, said connecting section being an internally threaded cylindrical section threadable onto said one end section of the actuator body, wherein, during use of the device attached to the actuator body of the by-pass valve, said valve portion is movable by said actuator between a closed position where flow of a heat exchange fluid between two ports of said valve is substantially blocked by said valve portion and an open position where said flow can take place.

18. The combined spacer and valve device according to claim 17 wherein said sleeve section has a length and is adapted to serve as a spacer to maintain said one end of the actuator body at least said length away from an adjacent end of a valve chamber formed by a valve housing of the by-pass valve.

* * * * *